United States Patent [19]

Chambors

[11] 4,275,293
[45] Jun. 23, 1981

[54] JAM DETECTION AND RECOVERY SYSTEM

[75] Inventor: John M. Chambors, Canton, Mich.

[73] Assignee: Burroughs Corporation, Detroit, Mich.

[21] Appl. No.: 108,797

[22] Filed: Dec. 31, 1979

[51] Int. Cl.³ .......................................... G01D 21/04
[52] U.S. Cl. ................................. 250/223 R; 340/674
[58] Field of Search ................... 250/223 R; 271/258, 271/259; 340/674

[56] References Cited

U.S. PATENT DOCUMENTS 4,151,410 4/1979 McMillan et al. ............... 250/223 R Primary Examiner—David C. Nelms
Assistant Examiner—Darwin R. Hostetter
Attorney, Agent, or Firm—Delbert P. Warner; Charles E. Quarton; Kevin R. Peterson

[57] ABSTRACT

A system for use with a document processor enabling the detection of jamming at its inception, prevention of additional jamming and routing of documents in the processor to selected pockets. When jamming conditions are detected, the receipt of further documents through the machine feeder into the processor is stopped, documents already in the processor which are located upstream from the point where jamming has occurred are routed to their proper pockets if they belong in upstream pockets, documents downstream from the point where jamming has occurred are routed to their proper pockets, and the remaining documents are routed to a pocket designated to receive missorted documents. Displays are illuminated to indicate jamming and to identify pockets into which missorted documents have been routed.

10 Claims, 5 Drawing Figures

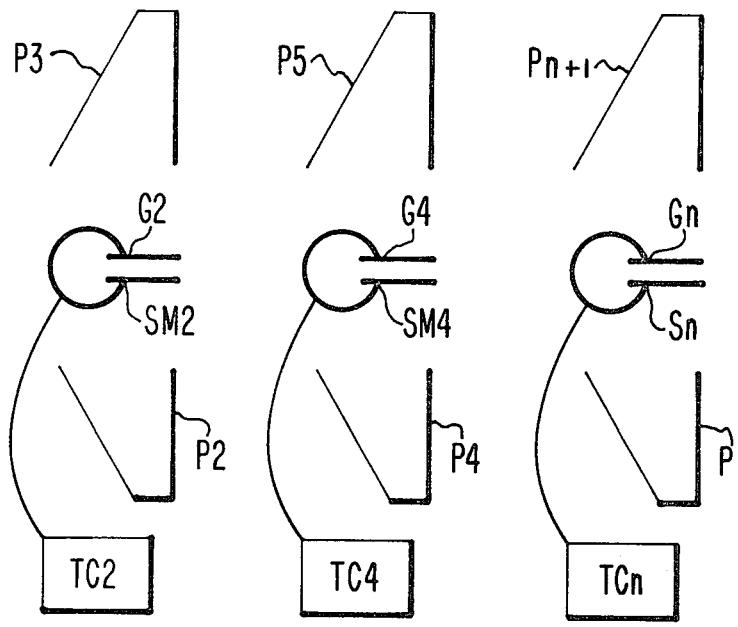

JAM DETECTION AND RECOVERY SYSTEM

CROSS REFERENCE TO A RELATED APPLICATION

An application disclosing a system to which the present invention relates is U.S. patent application Ser. No. 083,674, filed Oct. 11, 1979, filed in the names of John M. Chambors and A. H. McMillan entitled "A Self-Testing and Fault Tolerant Controller for a Stacker Module of a Document Sorting System" which has been assigned to the same assignee as the present application. That application is incorporated herein by reference.

BACKGROUND OF THE INVENTION

1. Field of the Invention

This invention relates to document sorting systems and particularly to apparatus for detecting jamming of documents in document sorting tracks and to the prevention of further jamming. The system involves detecting conditions attendent to jamming in document handling tracks and taking immediate action to prevent the introduction of new documents into a track while clearing the track by routing documents to their proper pocket destinations or to a missort pocket.

2. Description of the Prior Art

Exemplary prior art apparatus for preventing jamming in document processing equipment is disclosed in U.S. Pat. no. 4,151,410 dated Apr. 24, 1979. Apparatus according to that patent employs sensors spaced along document transport tracks to monitor the passage of the documents. Typically, the sensors are used to detect the translucency of each document. Translucency is variable through a document in motion because of irregularities in the paper. If no changes in translucency are perceived for a time while the equipment is running, it is understood that the document has stopped moving and the equipment has probably jammed. Additional related prior art involving the sensing of translucency is disclosed in U.S. Pat. No. 4,160,546 which is directed to the detection of overlap between documents in a document processing apparatus. That patent shows means for detecting overlap by testing for differences in translucency. While they concern relevant art, neither of the foregoing patents is believed to illustrate art which anticipates the present invention.

A related patent application is U.S. Ser. No. 942,469, filed Sept. 14, 1978, which relates to a Constant Spacing Document Feeder. That application involves apparatus which drives a feed wheel at an average speed, dependent upon the length of a document to provide constant spacing between documents. That application clearly does not anticipate the processing system employed in the practice of the present invention.

In the prior art, such as that referred to above, sensors in the individual pockets provide signals indicating when documents are received in the pockets. These signals are used to aid in determining when there is a missort and to operate signal devices, such as lamps, indicating that a missorted document has been placed in a particular pocket.

Prior art devices such as those outlined above have functioned well in earlier models of document processing equipment, but have not been found to be satisfactory in present machines which operate at higher speeds. In addition, the provision of separate detectors and display devices for each document pocket for the purpose of determining that missorted documents are present has proven to be costly. In addition, when a jam condition occurs, a need exists with present routing to clear the machine, which includes stopping the machine feeder to prevent the entry of further documents into the track and then clearing the track. Clearing the track, as conceived for present apparatus, involves completing the sorting of documents in the track upstream and downstream of the point at which the jam occurs while diverting a minimum number of documents to a pocket designated to receive non-sorted documents. These new requirements have led to a search for better means and to the development of the present invention.

SUMMARY OF THE INVENTION

The invention concerns a system for monitoring the flow of documents through the gates of a document processor, sorting documents into selected pockets and detecting conditions attendent upon document jamming. It relates further to the diversion of documents away from a jammed area in order to minimize the effects of jamming and includes displays for indicating the pockets to which documents have been diverted.

More specifically, the invention concerns document processing systems which employ diverter gates spaced along document transport tracks to sort documents into selected pockets. It relates particularly to a system for monitoring the flow of documents through the gates of a document processor and for the use of electronic sensors and logic means for detecting conditions attendent upon document jamming. It relates further to the diversion of documents away from a jammed area in order to minimize the effects of jamming and includes displays for indicating the presence of missorted documents in a pocket.

The diversion of documents away from the jammed area involves the use of signals from electronic logic means for stopping the machine feeder so that additional documents are not introduced into the track, diverting documents upstream of a jammed area out of the track into their proper pockets where possible and into a pocket designated to receive missorted documents where proper sorting is not possible, and diverting documents downstream of a jammed area into their proper pockets. The logic means also provides signals to an indicator to show which pocket has been designated to receive missorted documents.

The electronic logic means employed in the system includes microprocessors embodied in track controllers which are responsive to signals from a plurality of sensors spaced along the track to sense the position of documents, in the track. The sensors are coupled to the track controllers so that each controller looks at the sensor in its gate and the adjacent upstream sensor and performs three timing functions. First, it measures the time between the passage of a leading edge of a document from one sensor to another. Second, it determines for how long a time both sensors have been covered by one document. Third, it measures the time lapse as the trailing edge of a document passes from sensor to sensor. If the time period is too long for any of the three measurements, then there has been a slow down or stoppage of document flow and a jamming signal is transmitted upstream. This jamming signal is used to inform upstream controllers of the jammed condition and is used to determine when or whether to turn off the system feeder and divert documents from the tracks.

BRIEF DESCRIPTION OF THE DRAWINGS

FIG. 3 is a schematic diagram showing relationships between gates, and related components, for sorting documents into pockets;

FIG. 4 is a logic chart indicating relationships between signals from sensors detecting gate positions and the actual positions; and FIG. 5 is a logic chart showing relationships between signals from an interrupt line and signals from an operational line.

DESCRIPTION OF A PREFERRED EMBODIMENT

Figure 1:
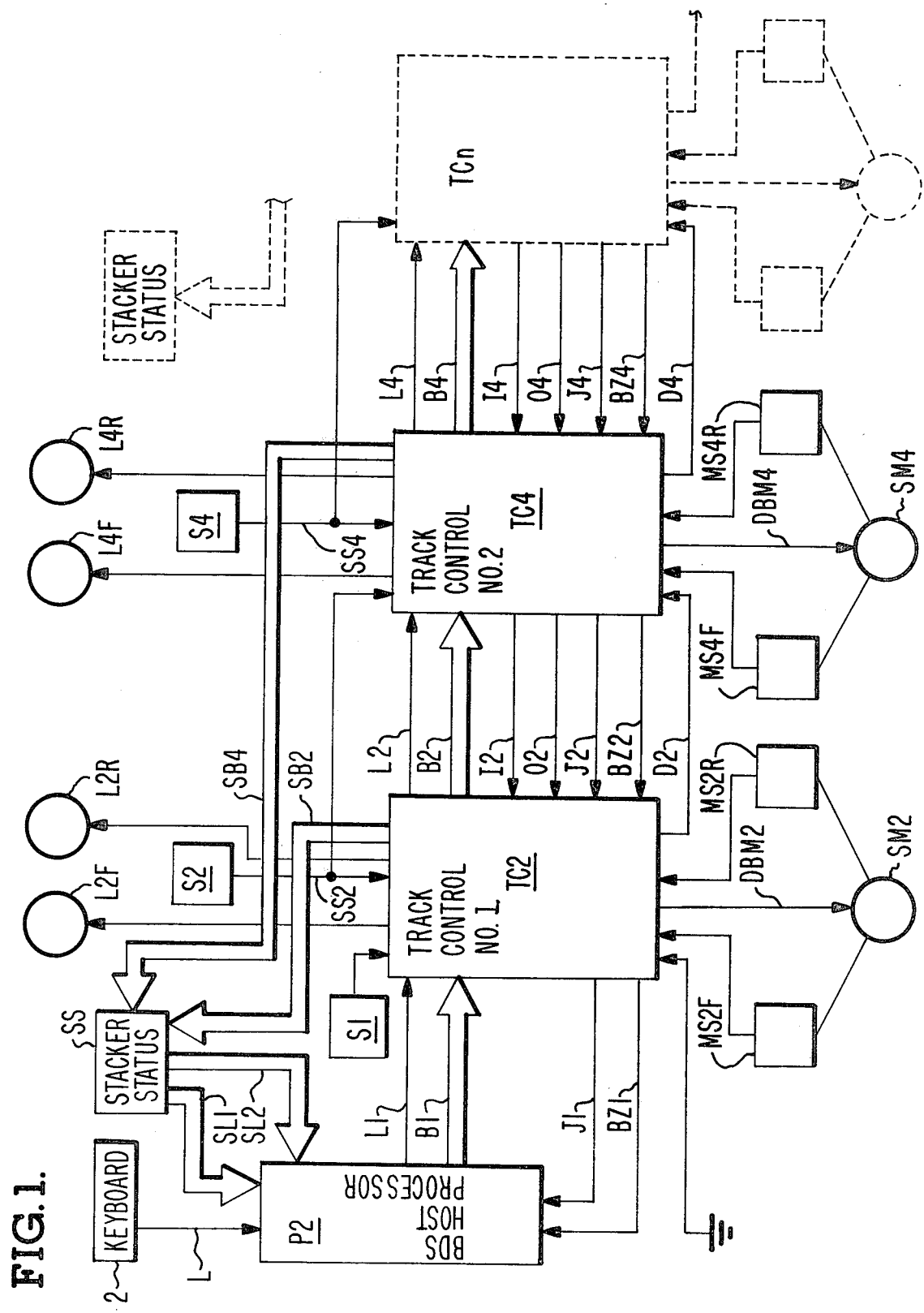
FIG. 1 is a block diagram depicting a control system for a sorting and anti-jamming system according to the invention.

Turn first to the block diagram of FIG. 1 which shows a system in accordance with the invention. In this view, a host processor P2 is employed to control the system through a plurality of track controllers, such as TC2, TC4 . . . TCn and supporting hardware, where TCn may designate as many as 18 or more controllers in a preferred embodiment. The host processor may be a BDS or Burroughs Data Systems processor manufactured by Burroughs Corporation. Exemplary track controllers employ 8035 single component 8-bit microcomputers available from Intel, AMD and others. An external program memory is used with the 8035, as indicated by block 4 in FIG. 2, which represents a 2758 EPROM.

The system will be applied in a preferred embodiment to a sorter employing a plurality of pockets into which documents are sorted. Sorting is effected by causing a gate to direct documents into a front pocket, a back pocket or along a direct line of a sorter track. A separate track controller is used to control each gate and to direct documents into associated pockets or to continue along the track as required. A portion of a typical sorter is shown in FIG. 3 where gates G2, G4 . . . Gn are controlled by stepping motors SM2, SM4 . . . SMn driven as required by associated track controllers TC2, TC4 . . . TCn. Front pockets P2, P4 . . . Pn and back pocket P3, P5 . . . Pn+1 are arranged to receive documents directed to each of them.

Operator control of the system is effected through a keyboard shown at 2 in FIG. 1 which, among other things, enables the operator to direct a "track clear" signal over lines L, L1, L2, L4 . . . to the track controllers to prepare them to receive information about documents. The operator supplies this track clear signal after determining that the document receiving equipment is in condition to receive and process documents.

The destination of each document, i.e. the pocket to which each document is to be diverted, is determined by reading and processing equipment (not shown) before the documents arrive for transmission along the track employed. The host processor P2 is supplied with information designating the sequence in which the documents will arrive and the destination of each in the form of a pocket address for each. The pocket address of each document is supplied by the host processor P2 over buses B1, B2, B4 . . . to successive track controllers TC2, TC4, etc. to enable the appropriate track controller to direct the documents to the correct pockets.

When a document sensor at S1, S2, S4, etc. provides signals over corresponding lines SL1, SL2, SL4, etc. to appropriate track controllers indicating the arrival of a document and the track controllers identify the document from the pocket address as belonging in a particular pocket under control of that track controller, then the appropriate track controller will energize the corresponding gate motor M2, M4, etc. causing it to divert the document to the appropriate front or rear pocket. In the absence of a determination that a document belongs in a pocket controlled by a particular track controller, the document will be transmitted along the track to successive sensors until it is identified as belonging in a particular pocket or must be diverted to a missort pocket.

Motor front and rear position sensors are indicated by blocks MS2F, MS2R, MS4F, MS4R . . . where the F labels refer to sensors positioned to detect whether gates are opened to permit documents to enter the front pockets and the blocks labelled R refer to sensors which detect whether gates are opened to permit documents to enter the rear pockets. The motor position sensors transmit signals to the appropriate track controllers indicating when a gate has moved.

Reference may be made to FIG. 4 for an explanation of the relationships between signals from a pair of sensors such as sensors MS2F, MS2R and the status of a related gate. When the gate is open towards the front pocket, a "1" will be transmitted from MS2F and a "0" will be transmitted from MS2R as shown under FRONT in the chart. When the gate is open towards the rear pocket, a "1" will be transmitted from MS2R and a "0" will be transmitted from MS2F as shown under REAR in the chart. When the gate is centered, one's will appear at both positions in the chart under CENTER.

Each of the controllers TC2, TC4, etc. is capable of generating a jam signal based on certain logical principles to be explained. A missort signal will be generated by a controller if for some reason a document has been routed into the wrong pocket. Both the jam and the missort signals are routed over appropriate jam lines which for that reason might be more accurately called jam-missort lines, but are referred to hereinafter as jam lines. The occurrence of a jam or missort is further distinguished by signals transmitted from the appropriate track controller over status lines SB2, SB4, etc., if needed.

Figure 2:
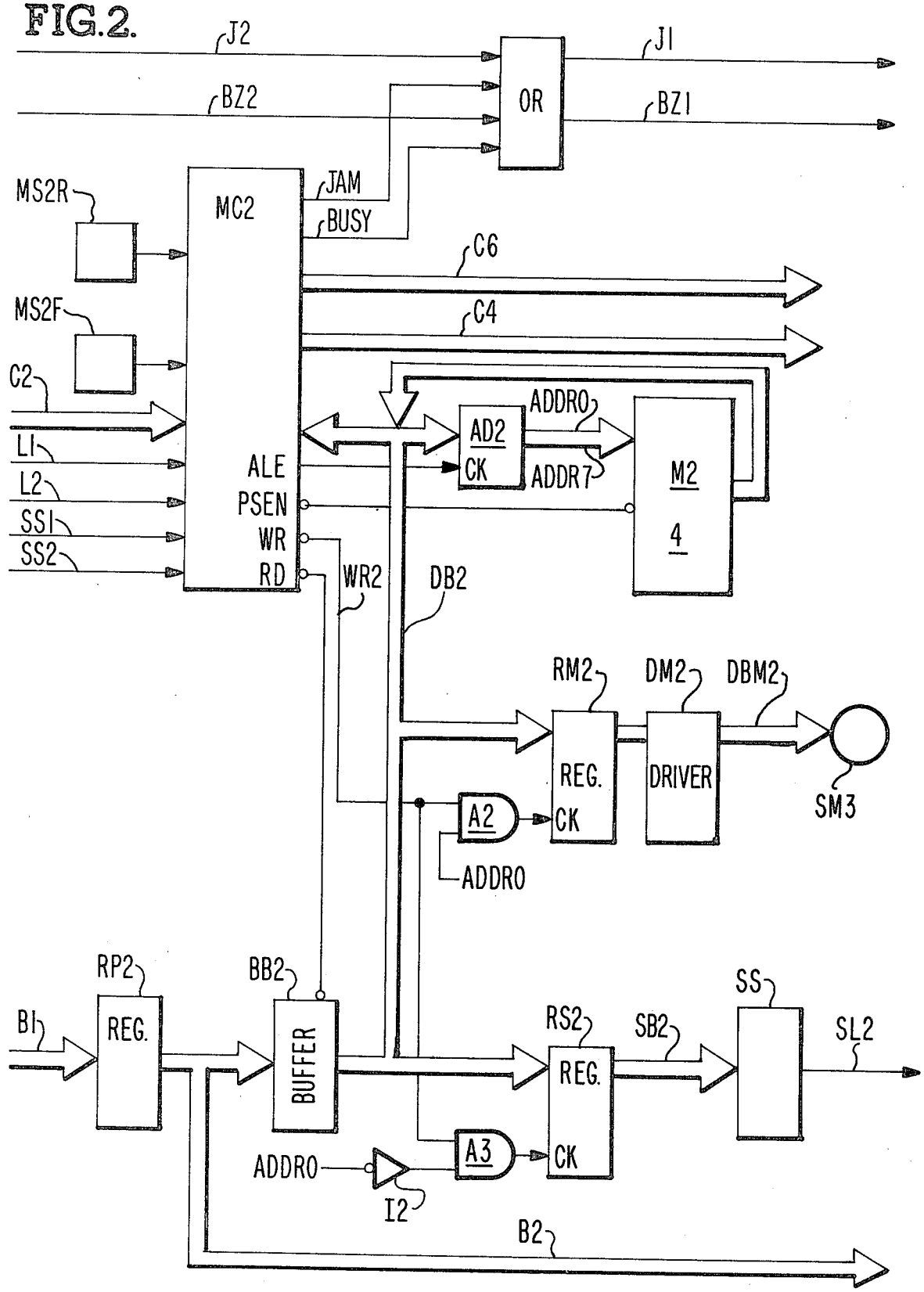
FIG. 2 is a block diagram showing details of a track controller according to the invention.

When either a jam or a missort signal is generated by a controller, it is transmitted in the upstream direction over a J line such as J4, J2 or J1 to the immediately upstream controller where it is placed through an OR gate together with any jam signal from that controller. This jam signal is then transmitted upstream to the next controller to be gated in an OR gate to produce a jam signal which ultimately reaches the Host Processor P2. Now, each one of these track controllers transmits a signal, through the OR gate indicating either that it has generated its own jam signal (if any) or is passing along a jam signal from downstream. Therefore, the signal going into the host processor indicates that a jam has occurred somewhere along the track controllers, but it doesn't indicate where. When a jam signal reaches the Host Processor P2, receipt of documents into the system is halted. The gating process involved is indicated in FIG. 2 by the "combinational logic box" labelled "OR".

A busy signal is provided over lines BZ4, BZ2, BZ1 which indicates when at least one of the controllers is processing a document. When a document enters the sensing area of a controller, the controller gives a busy readout and stays busy until the document leaves that area. This signal is not used directly for jam recovery or the detection of a jam. But it is of interest because it provides an input indicating to the host processor that something is happening in the tracks, i.e. documents out there are being processed.

In order for the central processor to determine where the jam signal is coming from, it reads the status lines SL1, SL2 . . . from the stacker status printed circuit board SS which provides information, as explained immediately below, identifying which track controller is actually sending the jam signal.

Each track controller provides signals to three status lines which are tied together in buses SB2, SB4, etc. which are connected to the stacker status card or board SS. The stacker status card functions as an interpreter between the track controls TC2, TC4, etc. and the Host Processor P2. Each of the track controller cards puts out certain status information over these lines. The stacker status board SS routes this information to the host processor over SL1, SL2 . . . along with a code signal identifying the source. By way of example, if track controller TC4 experiences a jam, it will send out a jam signal over J2 and J1 which will eventually travel to the host processor which cannot tell where the jam is. The stacker status card SS will send out signals identifying which track controller card has experienced the jam.

In order to sense documents, document sensors are supplied at S1, S2, S4, etc. Document sensor S1 is located upstream of the first track controller TC2 and is connected to the first track controller via line SS1 to indicate to that controller that a document is coming. Document sensors S2, S4, etc. are located in the respective gates that divert documents. The outputs of each of these sensors are fed over respective lines SS2, SS4, etc. into the track controller controlling that gate and also to the next downstream track controller. In this way each document sensor, after the first, feeds into two track controllers in a repetitious pattern. These document sensors actually detect the motion of the document along the track and provide document sensor inputs to the track controllers. These inputs are used for timing the documents in three ways to determine when jams occur. First, they are used to establish the time lapse from leading edge to leading edge between two sensors. Second, they establish the time lapse from trailing edge to trailing edge between two sensors. Third, they provide time signals while each sensor is covered by a single document.

The gate motors SM2, SM4, etc. are stepping motors controlled by respective track controllers. Each track controller thus controls a gate motor causing it to divert documents by positioning a gate into the front, rear or center positions. Each motor is controlled over a data bus through a motor command register and a step motor driver as indicated more fully in FIG. 2. Located on each motor are two sensors such as MS2F, MS2R which tell whether the gate is opened toward the front pocket, toward the rear pocket, or down the center.

FIG. 4 is a simple diagram as previously explained illustrating the logic employed with the motor position sensor. If there is a signal only from the front, the gate is opened toward the front position. A signal only from the rear indicates the gate is pointing toward the back pocket. If there is an output from both sensors, the gate is pointed down the track and documents will pass through.

Each track controller is coupled to two missort indicator lights labelled herein L2F, L2R, L4F, L4R, etc. where F and R refer to front and rear respectively. If the controller determines from its sensor that a document has gone into a wrong pocket, it will light the missort indicator which corresponds to that pocket where the document has been missorted, and also provides notice of a missort to the keyboard at 2. For example, on track controller number TC2, if the document was found to be going into the front pocket and it didn't belong there, it would light the front missort lamp L2F identifying the pocket containing the missorted document and also light a missort lamp at the operators console. Each controller can light one or both of the missort lamps if missorted documents are present in one or both of the associated pockets.

A number of general purpose communication lines are used to pass relevant information between the track controllers. Some of these may be called interrupt lines indicated at I2 . . . In. The interrupt lines carry signals from each track controller to the one immediately upstream. Track controller number 1, being identical to the other track controllers, is set up to generate a similar signal, but since there is no track control upstream, it has no place to which it can legitimately transmit the signal. In this connection, it will be noted that the purpose of the interrupt lines is to enable a track controller experiencing a jam in its area to immediately notify the track controller upstream to stop forwarding documents to the jammed area.

Other lines which are closely interlocked with the interrupt line are the operational lines O2 . . . On. These lines indicate the true status of each of the track controllers. An example is probably the best way to explain it. If everything is functioning normally, the system is working properly, and no jams have been detected in the controller, the operational line will be active indicating that the controller is fully operational to the upstream controller. But if something jams, as indicated by testing the three timing periods, the controller which detects the jam immediately provides an interrupt signal and at the same time goes non-operational. In essence, it thereby cuts itself off from the rest of the system at the point of the jam so that from that time onward, every time a document comes into the controller immediately upstream from the jam, that upstream controller will be informed by the status of signals on the interrupt and operational lines that the downstream controller is not operational and will allow additional documents to go into the jammed area. The immediate upstream controller will then intentionally missort documents due downstream into a front pocket and light the indicator corresponding to that pocket.

The foregoing explains the function of the interrupt and the operational lines. The operational line is really a station line that indicates when something is wrong in a controller and the interrupt line is used to get the attention of the upstream controller as soon as the fault is detected. As a result of these two signaling devices, no matter what a track controller is doing, it will promptly receive an interrupt signal notifying when something is wrong downstream accompanied by a discontinuation of the operational signal to emphasize the fact that something is wrong downstream.

FIG. 5 is a chart showing that the operational line actually serves two different functions. When you get an interrupt signal, shown on the chart as Int=0 in accordance with the logic being employed, you look at the operational line to see whether it is high or low. Again, the interrupt line always serves one purpose which is to get the attention of the upstream controller immediately. The operational line then passes information to the upstream controller advising whether the downstream controller is operational or not. If the operational not line is "high", (OPER=1), that indicates that there is a jam or some other trouble and the controller sending that signal is disconnecting itself while informing the upstream controller not to send any more documents as they will track into already jammed documents. If the operational not line is "low" (OPER=0), that indicates the controller downstream is still operational, has successfully received and detected the document downstream, and that the document has not been hung up anywhere in between. As previously indicated, a document can do one of three things at each controller, it can go into a front pocket, it can go into a rear pocket, or it can go through the center and proceed on downstream. If it goes through the center, it operates the appropriate sensor and the controller acknowledges its passage to the immediate upstream controller over the operational line. In other words, the operational line carries a signal which provides a double check to be sure the system is functioning properly. It indicates that the document hasn't gone into a front or rear pocket but has gone on downstream as it was intended to.

Another signal is the data signal which is supplied over data lines D2, D4 . . . from an upstream controller to a downstream controller. This signal is generated when the downstream controller interrupts an upstream controller and the upstream controller returns a signal over the data line indicating that a successful contact has been made and that interrupt signals may be stopped. In other words, the interrupt acknowledge signal informs the downstream controller that information has been successfully transmitted and that the interrupt request can be removed.

The processor data bus DB2, as shown in FIG. 2, provides paths over which a number of different functions may be carried out. At one time, it may be used for writing information to the step motor SM3 through the motor command register RM2 and the step motor driver DM2. This information can cause the step motor SM3 to divert documents into pockets or allow them to pass. At another time it might be used for accessing the program in the external program memory M2, and another time it might be used for putting information through the status register RS2 onto the status lines SB2 to the stacker card SS from which the information will be made available to the host processor over lines such as SL2. It can also receive information such as the pocket address over B1 through the pocket address register RP2 and input bus buffer BB2 at the exact time needed.

The micro controller MC2 generates a read signal at terminal RD that tells hardware in the system that information is to be brought into the processor through the data bus so the external program will be inactive, the command register RM2 for the motor M1 will be inactive and so will the output status register RS2. The only thing which can happen at this point with these restrictions is that the information from the pocket address register RP2 will be passed through the input bus buffer BB2 and go into the processor. The microcontroller MC2 tells this circuitry when to put information in so it can read. For example, when the microcontroller wants to put something on the status bus, it puts that information on the bus and enables the status register RS2 to retrieve it but at the same time shuts off the input bus buffer BB2 so the latter is not trying to put information on the bus at the same time.

To write to the status register RS2 or to the motor register RM2 there is a signal that leaves the microcontroller, after selection by the micro controller, that indicates that a write operation is taking place, i.e. it is not a read, it is not a memory operation, but it is data being transferred from the data bus DB2 to the command register RM2 for the motor or to the status register RS2 for the stacker status card SS.

Additional communications can be routed to and from the microcontroller over general communication lines such as C2 and C4. Line C6 represents connections to missort indicators such as appear at the keyboard.

An important input to the track controller is the address of documents that are coming down the track to be sorted. That input comes in from the Host Processor P2 over bus B1 to the pocket address register RP2, the input bus buffer BB2 and the bus DB2 to the controller MC2. The controller can then tell where the document should go and can command the step motor to assume the proper position for sorting the document at that stage whether it is to go to the front pocket, the back pocket or be allowed to go through the center and to the next track controller.

In order to control the external hardware effectively, a latching circuit is supplied in the data bus DB2 at AD2. This element is an 8 bit address latch with eight outputs indicated at ADDR0 . . . ADDR7. Before the microcontroller MC2 accesses any of the external devices, it sends an address out to indicate which device is to be contacted next.

In the case of the memory, there is a signal called the "program store enable" which is used to activate the memory and an address is put into the address latch to indicate which location in the memory is to be read. Its a two step operation. First there is a clock signal called address latch enable (ALE) which transfers an address along the data bus into this address latch and then a short time later, a program memory read signal is generated from PSEN on MC2 and using the information that is in the address latch, the program memory itself comes along, gets on the data bus and inputs data into the microcontroller MC2.

Just as there is a program store signal which activates the program memory, there are signals identified as write signals which activate output registers RM2 and RS2. The data bus is connected to each one of these output registers and there is a requirement that a control be provided to make a selection of one register to receive information from the data bus. This control is provided by a write signal from the WR terminal of MC2 over WR2 to NAND gates A2 and A3 in conjunction with an appropriate signal from the output ADDR0 of the eight bit address latch AD2 which causes a selection of either the motor register RM2 or the status register RS2 to receive information from the data bus. It will be seen that the inverter I2 will assure that both A2 and A3 do not receive the same signals.

Again, it will be noted, when it is desired to read something from the program memory, an address must be sent out first to specify which location in the memory must be read. In the same way, when a write operation is done and information is taken from the microcontroller and transferred either to the motor register or the status register, it is necessary to send out one address to the eight bit address latch. To send the desired information to a selected one of the output registers, it is necessary to pick up one of the address lines ADDR0 and depending on whether its high or low, to select either the motor register or the status register. And then, after its selected, the information comes out onto the bus and the write signal is used to clock it into either the motor register or the status register depending on the address.

One last thing that goes onto the bus is the pocket address which goes in from B1, the pocket address register RP2 and the input bus buffer BB2. The control signal for the bus buffer is a read signal from an RD terminal of MC2. As a consequence of this read signal data in the bus buffer is transferred from the pocket address register RP2 onto the bus through the bus buffer and into the micro controller MC2 enabling the micro controller to determine the address that was in the pocket address register.

SYSTEM OPERATION

For use in determining the operational status of the system a sensor is supplied at each gate which detects the leading edge of a document as it passes that sensor and provides a first signal marking that passage, provides a second and continuing signal while the document is between that sensor and its source of illumination and provides a third signal when the trailing edge of a document passes. From these three signals and signals from like sensors at successive gates, a microprocessor is able to measure the time between the passage of a leading edge of a document from one sensor to another. Second, it can determine for how long a time a sensor has been covered by a document. Third, it can measure the lapse from the time the trailing edge of a document uncovers one sensor to the time it uncovers the next sensor.

To apply the foregoing, the microprocessor checks three things:
1. it measures the time lapse as the leading edge of a document passes from sensor to sensor;
2. it measures to determine for how long a time a document covers two sensors, and
3. it measures the time lapse as the trailing edge of a document passes from sensor to sensor. If the time is too great for any of the three measurements, that means there has been a slow down or stoppage and a jam signal is transmitted upstream.

Each controller in the system is equipped to perform this same function. There is, of course, an overlap, since each controller looks at two sensors, one in the gate under control of that controller and one immediately upstream. There may be times when, in the case of a long document, as many as three controllers watch it at the same time. One detects its coming into an area, another detects its presence in the middle of its region and a third can be watching as it leaves an area of control.

Whenever a jam occurs in a certain area, the controller that has detected the slow down or stoppage contacts the controller immediately upstream and notifies that controller by way of a status line that a stoppage or jam has been detected. It is then the function of the immediate upstream controller to decide whether it can close off that portion of the track and prevent further jamming from occurring by preventing documents from entering the jammed area or whether to notify the controller immediately upstream from it and try to pass that responsibility along. As an example of inability of a controller to cope, a controller may have a document under control that is already committed to go into the jammed area. Since its too late to deflect the document, the jam signal is passed along to the next upstream controller.

The foregoing process continues until a controller is found that can become the last working controller, because it has been informed of the jam downstream and can prevent the transport of additional documents downstream. For then on, any documents to be sorted to the front or back pockets by the last working controller will be sorted as if no jam has occurred. But any documents that are supposed to go beyond the last working controller and into the jammed area will be deflected into a pocket and the missort indication will be given to the operator via a display at the operator's position and a display at the pocket where the missorted documents are located.

Basically, it can be said that when a jam occurs, a search is made to find a controller that is not involved in the jam. The feeder of the system is shut down immediately, but the documents still in the track must be processed, so any documents which are supposed to be sorted before the jammed area will be sorted properly and any documents that are supposed to go into the jammed area will be detoured into a missort pocket and the operator notified.

What is claimed is:

1. A jam detection and recovery system for a document processor employing a plurality of diverter gates aligned along a document transport track, in association with a plurality of pockets, to receive and route documents into the pockets on a selective basis, comprising:
    sensing means positioned along a document transport track to detect the presence of documents at selected points along the track and provide signals when documents are present;
    said sensing means including at least one sensing means positioned along the track before a first diverter gate and sensing means associated with each of a plurality of diverter gates to detect the presence of a document at each gate and provide a signal;
    a track controller coupled to each of a plurality of said sensing means to receive said signals;
    said track controllers responding to selected pluralities of said signals to determine when a jam has occurred in the track; and
    said track controllers providing warning signals, when a jam has occurred, of use to enable the diverter gates to divert documents from the track to suitable pockets to avoid further jamming.

2. The invention as claimed in claim 1, in which:
    each track controller is coupled to a sensor at its gate and to a sensor located upstream from its gate;
    each track controller measures the time between the passage of a leading edge of a document from one sensor to the next;
    each track controller measures the time two sensors are covered by one document;
    each track controller measures the time between the passage of a trailing edge of a document from one sensor to the next; and
    each track controller determines when any of the measurements of time exceeds a certain length and generates a jam signal when a time exceeds that length.

3. The invention as claimed in claim 2, including:

means to transmit the jam signal generated at a first track controller upstream toward the next track controller; and means for transmitting an interrupt acknowledge signal from said next track controller toward the first track controller to indicate the jam signal has been received.

4. The invention as claimed in claim 3, in which:

the next track controller in response to a jam signal from the first track controller, determines whether it can prevent further jamming based on signals from associated sensors;

said next track controller, in the event it finds it cannot prevent further jamming, provides the jam signal to another upstream track controller;

said next track controller, in the event it finds it can prevent further jamming, provides signals indicating no additional documents should be received into the system and provides signals to the relevant gates to divert documents into selected pockets.

5. The invention as claimed in claim 1, 2, 3 or 4, in which:

the track controllers each include a microcomputer for responding to signals from said sensing means; and the microcomputers are programmed to determine when a jamming condition occurs on the track and provide a signal indicating jamming has occurred.

6. The invention as claimed in claims 1, 2, 3 or 4, in which:

the document processor includes front and back pockets;

the gates are controlled by the associated track controller to direct documents down the track or alternatively to direct them into a front or a back pocket;

sensor means associated with said gates provide status signals indicating a gate has been opened to the front pocket, the back pocket or straight ahead;

means are provided to transmit said status signals to the associated track controller to enable the track controller to confirm where a document has been directed.

7. The invention as claimed in claim 6, in which:

the track controllers each include a microcomputer for responding to signals from said sensing means; and the microcomputers are programmed to determine when a jamming condition occurs on the track and provide a signal when jamming has occurred.

8. A system for monitoring the flow of documents through gates of a document processor, detecting conditions attendent to document jamming and preventing further jamming, comprising:

a plurality of sensors spaced along document transport tracks to detect the presence and passage of documents in the tracks;

a plurality of motor controlled gates spaced along the document transport tracks to regulate the flow of documents between the tracks and a plurality of pockets;

a plurality of track controllers coupled to selected gates and selected sensors;

said track controllers including microprocessors programmed to make logical decisions relating to the condition of the transport tracks;

said microprocessors responding to selective signals from selected multiples of said sensors to determine that a jamming condition exists and provide jam signals; and means associated with the track controllers responsive to said jam signals to provide command signals directing the motors of selected gates to divert documents out of a jammed path.

9. The invention as claimed in claim 8, in which:

each track controller is coupled to control a gate, and is coupled through its associated microprocessor to a sensor adjacent to said gate and to a sensor located upstream of said gate;

said associated microprocessor is programmed to sense signals from the coupled sensors to detect a jam condition and provide a jam signal;

the track controller and upstream track controllers are coupled to receive the jam signal and operate their respective gates to minimize jamming, and the track controllers include means to generate signals capable of use for turning off a machine feeder to prevent the entry of additional documents to the document tracks.

10. The invention as claimed in claims 8 or 9, in which the microprocessors are programmed to make a number of measurements including:

a measurement of the time period between the passage of a leading edge of a document from one sensor to another;

a measurement of the time period during which two sensors have been covered by a document; and a measurement of the time period between the passage of a trailing edge of a document from one sensor to another, whereby any of said microprocessors is enabled to provide a jam signal when any one of said time periods exceeds a certain limit.

* * * * *